United States Patent
Loewenberg

(10) Patent No.: US 9,726,020 B2
(45) Date of Patent: Aug. 8, 2017

(54) EXHAUST-GAS TURBOCHARGER

(71) Applicant: BorgWarner Inc., Auburn Hills, MI (US)

(72) Inventor: Michael Loewenberg, Weierhof/bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 438 days.

(21) Appl. No.: 14/383,166

(22) PCT Filed: Mar. 7, 2013

(86) PCT No.: PCT/US2013/029490
§ 371 (c)(1),
(2) Date: Sep. 5, 2014

(87) PCT Pub. No.: WO2013/138143
PCT Pub. Date: Sep. 19, 2013

(65) Prior Publication Data
US 2015/0030455 A1 Jan. 29, 2015

(30) Foreign Application Priority Data
Mar. 15, 2012 (DE) .................. 10 2012 005 283

(51) Int. Cl.
*F01D 5/02* (2006.01)
*F16D 1/076* (2006.01)

(52) U.S. Cl.
CPC ............. *F01D 5/025* (2013.01); *F16D 1/076* (2013.01); *F05D 2220/40* (2013.01); *F05D 2260/31* (2013.01)

(58) Field of Classification Search
CPC ...... F01D 5/025; F16D 1/076; F05D 2260/31; F05D 2220/40
See application file for complete search history.

(56) References Cited

U.S. PATENT DOCUMENTS 7,223,077 B2 5/2007 Nishiyama et al.
7,878,758 B2 2/2011 Allen et al.

FOREIGN PATENT DOCUMENTS

| JP | 57092001 U | 6/1982 |
| JP | 02127986 A | 5/1990 |
| JP | 03122203 U | 12/1991 |

OTHER PUBLICATIONS

International Search Report in International Application No. PCT/US2013/029490, dated Jun. 4, 2013.

*Primary Examiner* — Ryan J Walters
(74) *Attorney, Agent, or Firm* — Eric L. Doyle; Stephan A. Pendorf; Patent Central LLC

(57) ABSTRACT

An exhaust-gas turbocharger (1), having a shaft (2) which has an outer diameter ($A_2$); a turbine wheel (5) which is fastened to the shaft (2); and a connecting device (8) via which the shaft (2) is fastened to the turbine wheel (5). The shaft (2) has, in the region of an end side (3), a shaft shoulder (4) with an outer diameter ($A_4$) larger than the outer diameter ($A_2$) of the shaft (2). The turbine wheel (5) has an external thread portion (7) integrally formed on its wheel rear side (6) The connecting device (8) has a sleeve nut (8A) which is screwed onto the external thread portion (7) and, in a process, engages behind the shaft shoulder (4) in order to brace the shaft (2) against the turbine wheel (5).

12 Claims, 1 Drawing Sheet

EXHAUST-GAS TURBOCHARGER

BACKGROUND OF THE INVENTION

Field of the Invention

The invention relates to an exhaust-gas turbocharger.

Description of the Related Art

An exhaust-gas turbocharger of said type is known from U.S. Pat. No. 7,287,960 B2. The rotor of said known exhaust-gas turbocharger is formed by a turbine wheel which has a connecting peg on its wheel rear side. The connecting peg is inserted into a cavity of a shaft shoulder of the shaft of the exhaust-gas turbocharger and is soldered.

It is an object of the present invention to provide an exhaust-gas turbocharger, the turbine wheel of which can be connected to the shaft in a simple and secure manner.

BRIEF SUMMARY OF THE INVENTION

According to the invention, a screw connection is provided for the connection of the shaft and turbine wheel. The screw connection comprises firstly an external thread which is arranged on the wheel rear side of the turbine wheel. For this purpose, it is possible for the wheel rear side to be provided with a threaded peg on which the external thread is formed. The connecting device also comprises a sleeve nut which, for the assembly of the shaft and turbine wheel, is pushed over the shaft and screwed onto the external thread of the turbine wheel. During the course of the screwing-on process, the sleeve nut abuts against a shaft shoulder of the shaft and braces the shaft against the turbine wheel.

It is preferably possible for the sleeve nut to be centered on the shaft and/or on the turbine wheel as it is screwed on.

Furthermore, the shaft and the turbine wheel may be aligned relative to one another by means of a further centering device.

For the transmission of force between the turbine wheel and the shaft, it is furthermore possible to provide, in addition to the stated bracing action, a positively locking connection between the shaft and the turbine wheel, for example in the region of a lateral surface of the threaded peg of the turbine wheel and/or of a lateral surface of a centering projection of the shaft, which centering projection can be inserted into a centering recess of the turbine wheel.

Alternatively, to secure the braced components (turbine wheel and shaft), it is possible to produce a positively locking/cohesive connection between the sleeve nut and the turbine wheel or between the sleeve nut and the shaft.

Here, after the screwing-on process, at least one, preferably two bores may be drilled through the sleeve nut and the shaft. Pins can subsequently be inserted into and secured in said bores.

A further possibility for a supplementary positively locking connection consists in at least one, preferably two bores being formed through the sleeve nut and into the turbine wheel after the components have been screwed together. Pins may again be inserted into and secured in said bores.

An example of an additional cohesive connection is the provision of radial and/or axial bores in the sleeve nut. Said bores may be welded to the shaft after the bracing of the components.

BRIEF DESCRIPTION OF THE SEVERAL VIEWS OF THE DRAWINGS

Further details, advantages and features of the present invention will emerge from the following description of an exemplary embodiment on the basis of the drawing, in which.

DETAILED DESCRIPTION OF THE INVENTION

Figure 1:
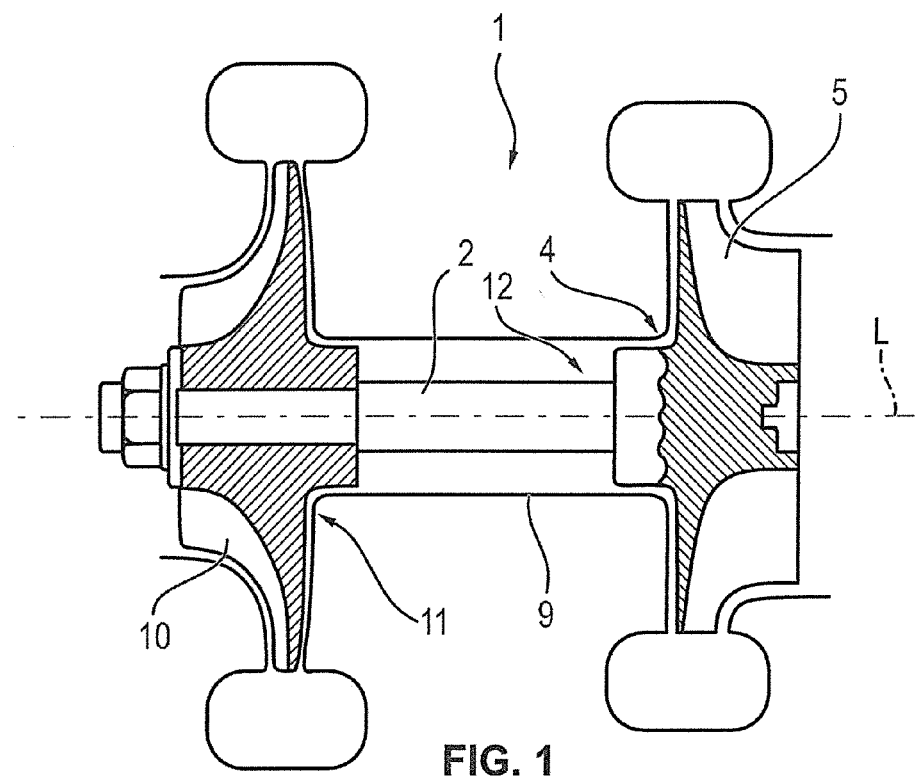
FIG. 1 is a schematically highly simplified diagrammatic illustration of an exhaust-gas turbocharger according to the invention.

FIG. 1 illustrates, in a schematically highly simplified diagrammatic illustration, an exhaust-gas turbocharger 1 according to the invention. The exhaust-gas turbocharger 1 has a shaft 2 which is mounted in a bearing housing 12. On one end of the shaft 2 there is mounted a turbine wheel 5 of a turbine 4. At the opposite end, a compressor wheel 10 of a compressor 11 is fixed to the shaft 2.

Figure 2:
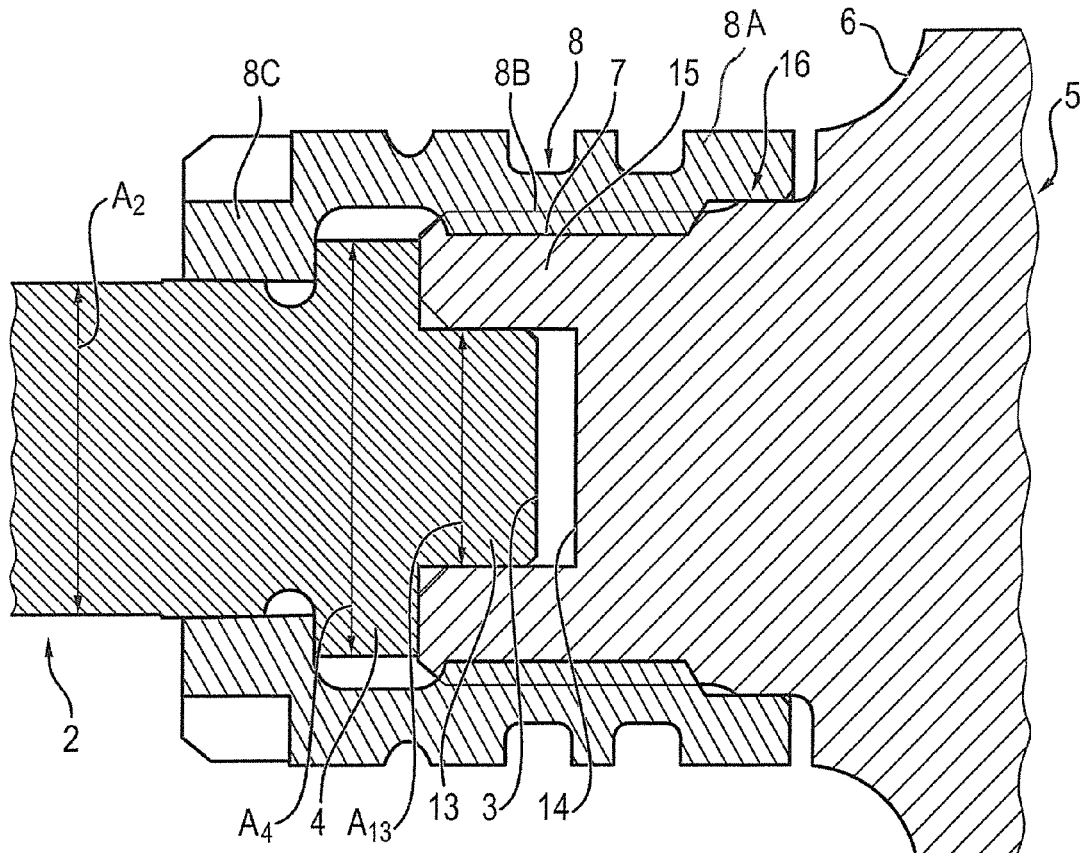
FIG. 2 is a schematically slightly simplified illustration of the joining region between the shaft and the turbine wheel of the exhaust-gas turbocharger, as per claim 1.

FIG. 2 illustrates the joining or connecting region between the shaft 2 and the turbine wheel 5 on an enlarged scale. Here, FIG. 2 shows that the shaft 2 is provided, adjacent to an end side 3, with a shaft shoulder 4 whose outer diameter $A_4$ is larger than the outer diameter $A_2$ of the shaft 2.

From the shaft shoulder 4, a centering projection 13 extends to the end side 3, the outer diameter $A_{13}$ of which centering projection is smaller than the outer diameter $A_4$. In the assembled state illustrated in FIG. 2, said centering projection 13 engages into a centering recess 14 which is arranged in a threaded peg 15 which is integrally formed on the wheel rear side 6 of the turbine wheel 5.

FIG. 2 also shows a connecting device 8 which, in the particularly preferred embodiment illustrated in FIG. 2, is formed by a sleeve nut 8A with an internal thread 8B and with a holding region 8C and by an external thread portion 7 on the threaded peg 15 of the turbine wheel 5.

The assembled state illustrated in FIG. 2 shows that, as a result of the sleeve nut 8A being screwed onto the external thread portion 7, the holding region 8C engages behind the shaft shoulder 4 and thereby braces the shaft 2 and the turbine wheel 5 against one another.

In addition to the centering device explained above in the form of the centering shoulder 13 and the centering recess 14, there may alternatively or additionally be provided a further centering device 16 which comprises mating surfaces on the sleeve nut 8 and on the turbine wheel 5 or on the threaded peg 15, as can be seen in detail from the diagrammatic illustration of FIG. 2.

In addition to the bracing of the shaft 2 and turbine wheel 5 as described above on the basis of FIG. 2, it is possible (but not imperative) for the positively locking and/or cohesive connection devices explained in the introduction, which are however not illustrated in FIG. 2, to also be provided for the transmission of force.

In addition to the above written disclosure of the invention, reference is hereby explicitly made, to supplement the disclosure, to FIGS. 1 and 2.

LIST OF REFERENCE SYMBOLS

1 Exhaust-gas turbocharger
2 Shaft
3 End side
4 Shaft shoulder
5 Turbine wheel
6 Wheel rear side
7 External thread portion
8 Connecting device 8A Sleeve nut
8B Internal thread
8C Holding region
9 Bearing housing
10 Compressor wheel
11 Compressor
12 Rotor
13 Centering projection
14 Centering recess
15 Threaded peg
16 Centering device
L Longitudinal central line of the exhaust-gas turbocharger or rotor
$A_2$ Outer diameter of the shaft 2
$A_4$ Outer diameter of the shaft shoulder 4
$A_{13}$ Outer diameter of the centering projection 13

The invention claimed is:

1. An exhaust-gas turbocharger (1), having
a shaft (2) which has an outer diameter ($A_2$);
a turbine wheel (5) which is fastened to the shaft (2); and
a sleeve nut (8A) by means of which the shaft (2) is fastened to the turbine wheel (5); wherein
the shaft (2) has, in the region of an end (3), a shaft flange (4) which comprises an outer diameter ($A_4$) larger than the outer diameter ($A_2$) of the shaft (2), the flange having first axial face facing the turbine wheel and a second axial face facing away from the turbine wheel;
the turbine wheel (5) has a wheel rear side (6) and has an external thread portion (7) integrally formed on its wheel rear side (6); and
the sleeve nut (8A) has a first end having an inner diameter at least as large as the flange (4) outer diameter ($A_4$) and which is internally threaded and which is screwed onto the external thread portion (7) of the turbine wheel (5), and a second end having a diameter approximately equivalent to the shaft outer diameter ($A_2$), the second end having an inward flange which engages the shaft flange (4) second axial face to thereby abut and brace the shaft (2) flange (4) first axial face against the turbine wheel (5).

2. The exhaust-gas turbocharger as claimed in claim 1, wherein screwing of the sleeve nut (8A) onto the turbine wheel (5) locks the shaft flange (4) between the turbine wheel (5) and the inward flange.

3. The exhaust-gas turbocharger as claimed in claim 1, wherein the external thread portion (7) is arranged on a threaded peg (15) which is integrally formed on the wheel rear side (6) of the turbine wheel (5), wherein the threaded peg (15) has a coaxial internal bore (14), and wherein the shaft has a peg dimensioned for mating engagement in the threaded peg (15) internal bore (14).

4. The exhaust-gas turbocharger as claimed in claim 1, including a positively-locking connection which comprises at least one bore through the sleeve nut (8A) and into the shaft (2), into which bore a pin is inserted and secured.

5. The exhaust-gas turbocharger as claimed in claim 1, including a positively-locking connection which has at least one bore through the sleeve nut (8A) and into the turbine wheel (5), into which bore a pin is inserted and secured.

6. The exhaust-gas turbocharger as claimed in claim 1, including a cohesive connection which has radial or axial bores into the sleeve nut (8A) which, after the bracing of the shaft (2) and turbine wheel (5), is welded to the shaft (2).

7. A rotor (12) of an exhaust-gas turbocharger (1), having
a shaft (2) which has an outer diameter ($A_2$);
a turbine wheel (5) which is fastened to the shaft (2); and
a sleeve nut (8A) by means of which the shaft (2) is fastened to the turbine wheel (5); wherein
the shaft (2) has, in the region of an end (3), a shaft flange (4) which comprises an outer diameter ($A_4$) larger than the outer diameter ($A_2$) of the shaft (2), the flange having first axial face facing the turbine wheel and a second axial face facing away from the turbine wheel;
the turbine wheel (5) has a wheel rear side (6) and has an external thread portion (7) integrally formed on its wheel rear side (6); and
the sleeve nut (8A) has a first end having an inner diameter at least as large as the flange (4) outer diameter ($A_4$) and which is internally threaded and which is screwed onto the external thread portion (7) of the turbine wheel (5), and a second end having a diameter approximately equivalent to the shaft outer diameter ($A_2$), the second end having an inward flange which engages the shaft flange (4) second axial face to thereby abut and brace the shaft (2) flange (4) first axial face against the turbine wheel (5).

8. The rotor as claimed in claim 7, wherein screwing of the sleeve nut (8A) onto the turbine wheel (5) locks the shaft flange (4) between the turbine wheel (5) and the inward flange.

9. The rotor as claimed in claim 7, wherein the external thread portion (7) is arranged on a threaded peg (15) which is integrally formed on the wheel rear side (6) of the turbine wheel (5), wherein the threaded peg (15) has a coaxial internal bore (14), and wherein the shaft has a peg dimensioned for tight engagement in the threaded peg (15) internal bore (14).

10. The rotor as claimed in claim 7, including a positively-locking connection which comprises at least one bore through the sleeve nut (8A) and into the shaft (2), into which bore a pin is inserted and secured.

11. The rotor as claimed in claim 7, including a positively-locking connection which has at least one bore through the sleeve nut (8A) and into the turbine wheel (5), into which bore a pin is inserted and secured.

12. The rotor as claimed in claim 7, including a cohesive connection which has radial or axial bores into the sleeve nut (8A) which, after the bracing of the shaft (2) and turbine wheel (5), is welded to the shaft (2).

* * * * *